(12) United States Patent
Langenfeld et al.

(10) Patent No.: US 8,235,858 B1
(45) Date of Patent: Aug. 7, 2012

(54) GEAR DRIVE

(75) Inventors: Thomas J. Langenfeld, Sullivan, IL (US); Jesse L. Probst, Strasburg, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 110 days.

(21) Appl. No.: 12/830,130

(22) Filed: Jul. 2, 2010

Related U.S. Application Data

(60) Provisional application No. 61/222,562, filed on Jul. 2, 2009.

(51) Int. Cl.
*F16H 48/06* (2006.01)
(52) U.S. Cl. .......................... 475/225; 475/230
(58) Field of Classification Search .................. 475/225, 475/230
See application file for complete search history.

(56) References Cited

U.S. PATENT DOCUMENTS

| 6,651,529 | B1 | 11/2003 | Poplawsli et al. | |
| 2006/0025273 | A1* | 2/2006 | Gradu | 475/225 |
| 2008/0287245 | A1* | 11/2008 | Kikura et al. | 475/221 |

* cited by examiner

*Primary Examiner* — Edwin A Young
(74) *Attorney, Agent, or Firm* — Neal, Gerber & Eisenberg LLP

(57) ABSTRACT

A compact gear drive assembly for powered equipment includes a housing having a first tubular extension, and an input shaft having a first end located in the housing and a second end extending from the housing through the first tubular extension. The gear drive assembly further includes a first stage gear reduction engaged to and driven by the first end of the input shaft, a second stage gear reduction engaged to and driven by the first stage gear reduction, and an axle engaged to and driven by the second stage gear reduction.

19 Claims, 13 Drawing Sheets

GEAR DRIVE

CROSS-REFERENCE

This application claims the benefit of U.S. Provisional Patent Application No. 61/222,562 filed on Jul. 2, 2009, which is incorporated by reference herein in its entirety.

BACKGROUND OF THE INVENTION

This invention relates to a gear drive assembly for use in driving, for example, an auger for a snow thrower.

SUMMARY OF THE INVENTION

An improved gear drive assembly is disclosed herein, including gear reduction assemblies to provide for a less expensive, lighter and more compact unit.

The present invention comprises a gear drive assembly for use in a utility vehicle or other power equipment. A compact gear drive assembly for powered equipment includes a housing having a first tubular extension, and an input shaft having a first end located in the housing and a second end extending from the housing through the first tubular extension. The gear drive assembly further includes a first stage gear reduction engaged to and driven by the first end of the input shaft, a second stage gear reduction engaged to and driven by the first stage gear reduction, and an axle engaged to and driven by the second stage gear reduction.

The gear drive assembly is shown in use with a snow thrower. While shown and described in reference to utility vehicles, it will be apparent to those skilled in the art that the gear drive assembly defined herein could be utilized in a variety of other configurations or applications that require transfer of mechanical power from a prime mover, either directly or indirectly, through a compact gear drive assembly.

In one aspect of the invention, the two-stage gear reduction includes two bevel gear reductions. In another aspect of the invention, the two-stage gear reduction includes a first stage bevel gear reduction and a second stage planetary gear reduction.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
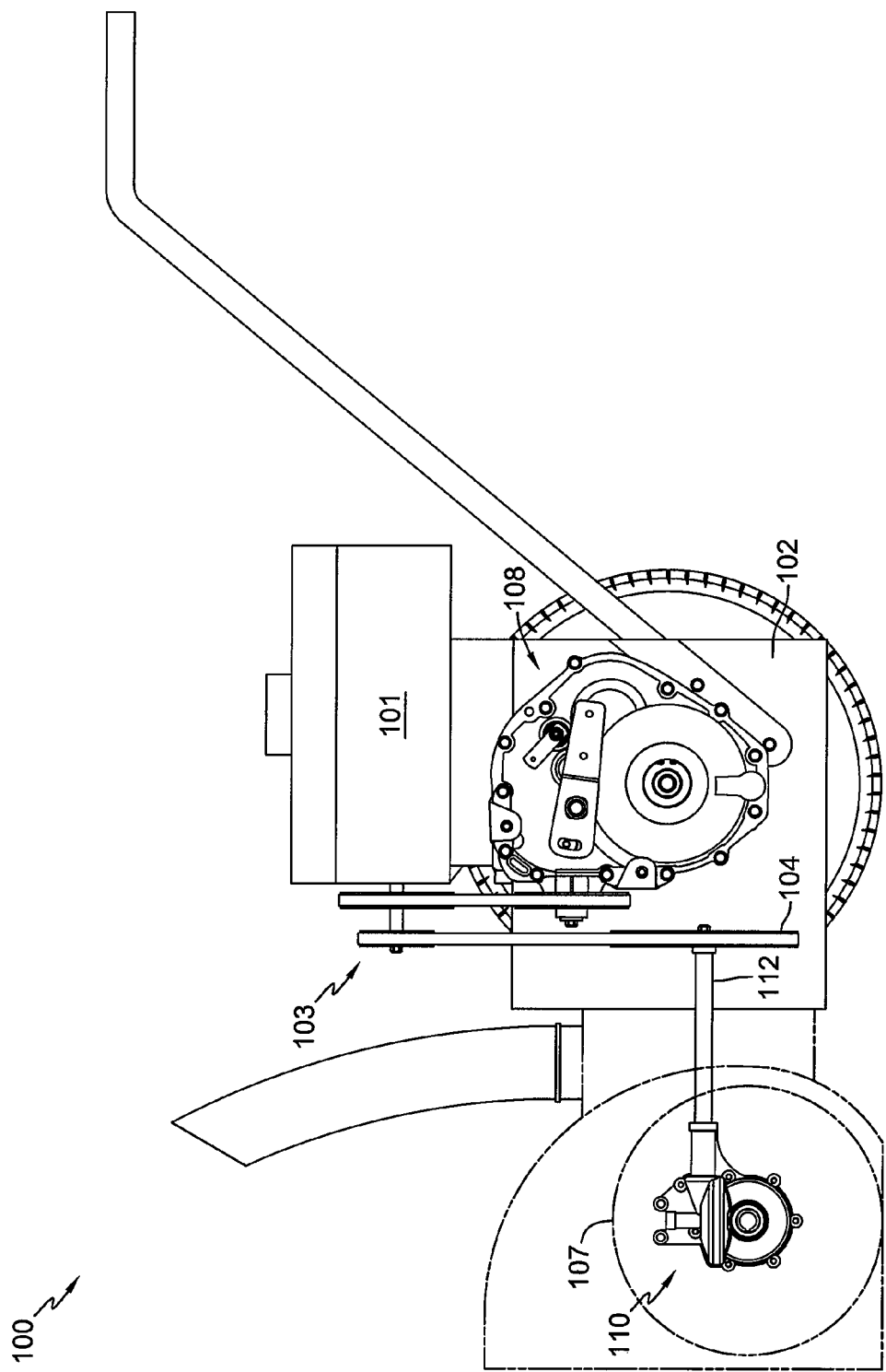
FIG. 1 is a side elevational view of a snow thrower incorporating a first embodiment of a gear drive assembly in accordance with the principles of the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

Vehicle 100, shown in FIG. 1 as a snow thrower, includes a prime mover such as engine 101 mounted on vehicle frame 102 and an auger 107 used to feed snow to a blower device (not shown). Engine 101 powers a drive belt and pulley system 103 to power both transaxle 108 and gear drive assembly 110, as described in more detail herein. Transaxle 108 may be of various known types, and it will not be described in detail herein. A similar transaxle design is shown in commonly-owned U.S. Pat. No. 6,651,529, the terms of which are incorporated herein by reference.

Figure 2:
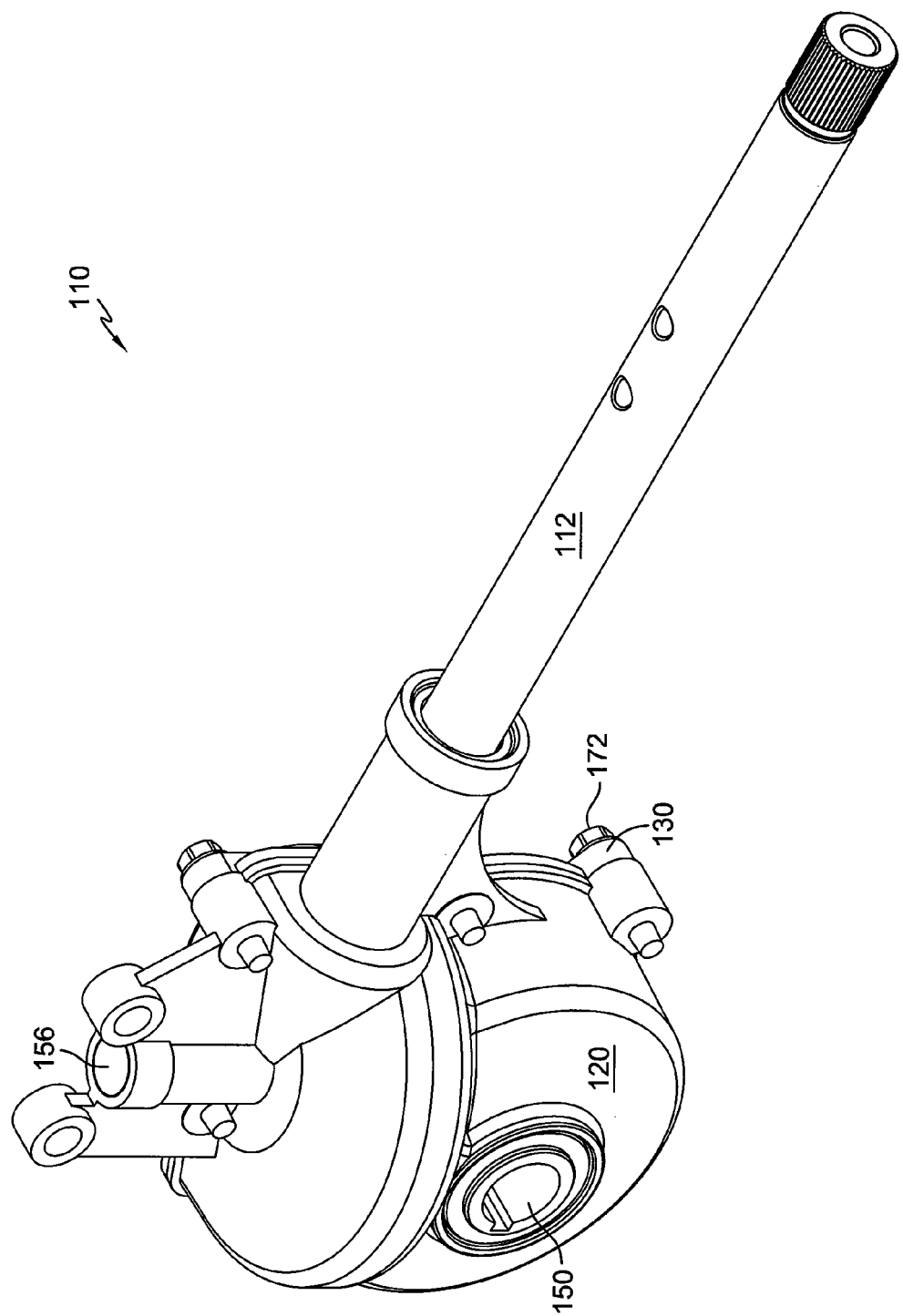
FIG. 2 is a perspective view of the gear drive assembly in accordance with the first embodiment.
Figure 3:
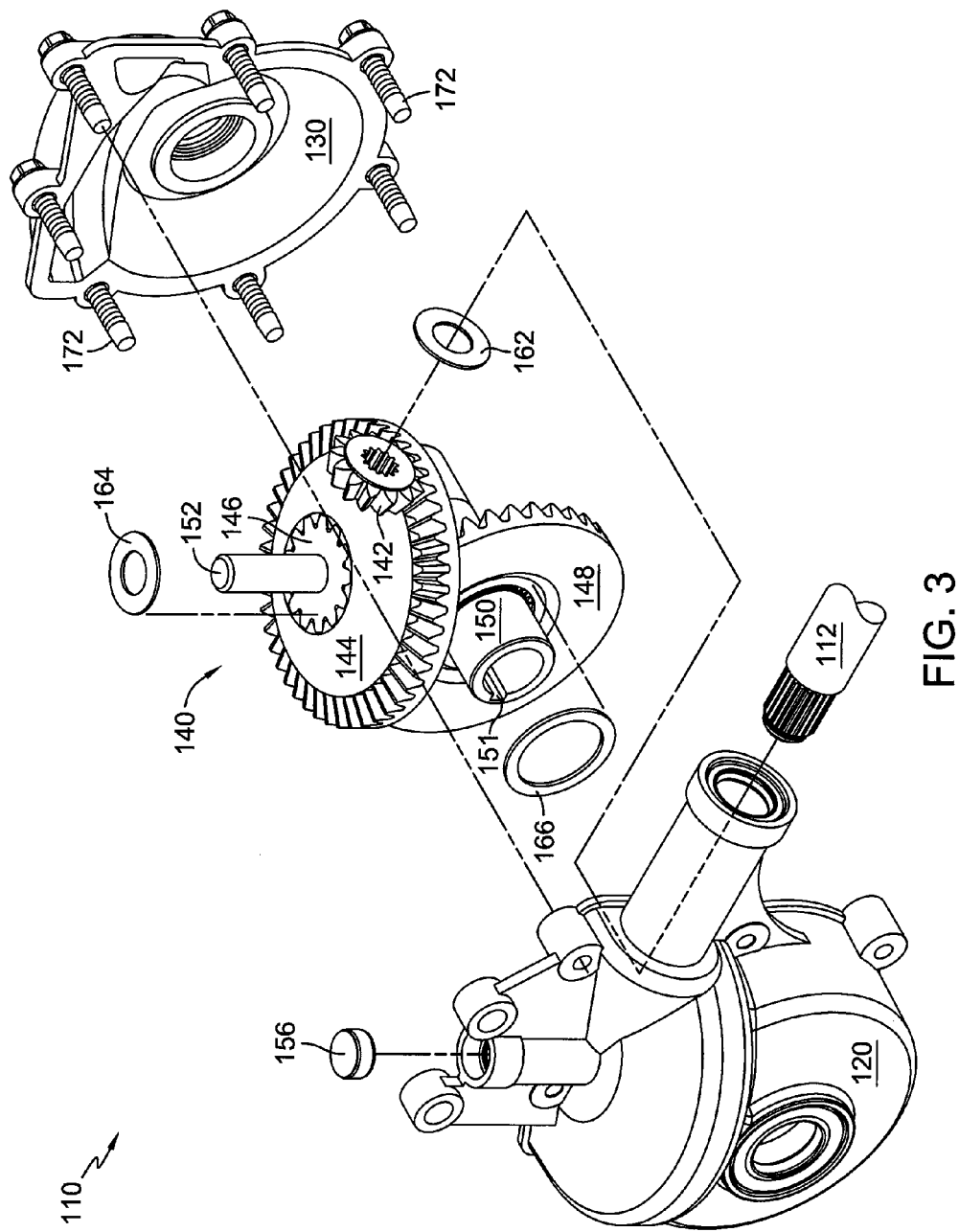
FIG. 3 is an exploded perspective view of the gear drive assembly of FIG. 2.
Figure 4:
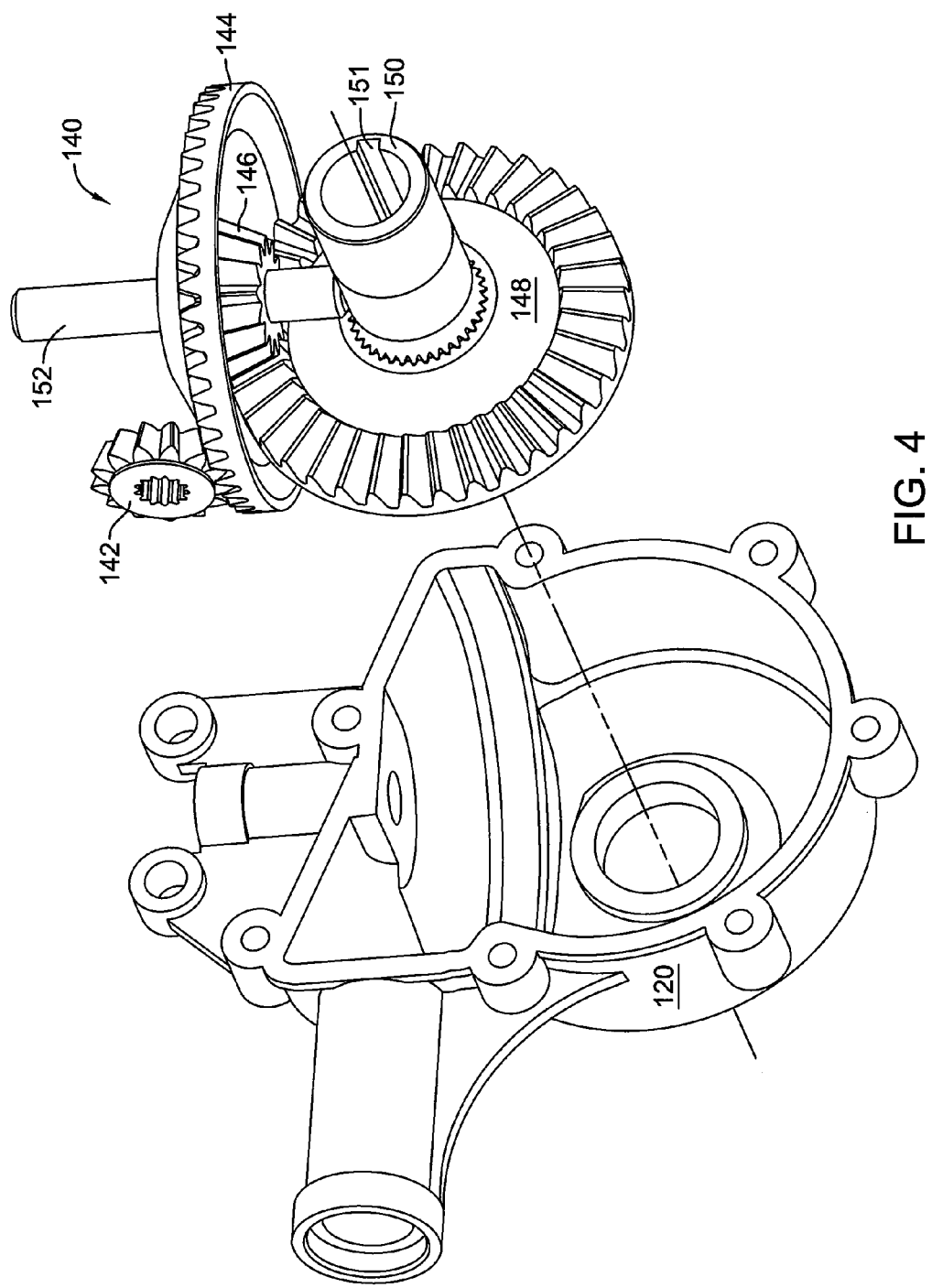
FIG. 4 is a further exploded perspective view of certain gearing components and a housing element of the gear drive assembly of FIG. 2.
Figure 5:
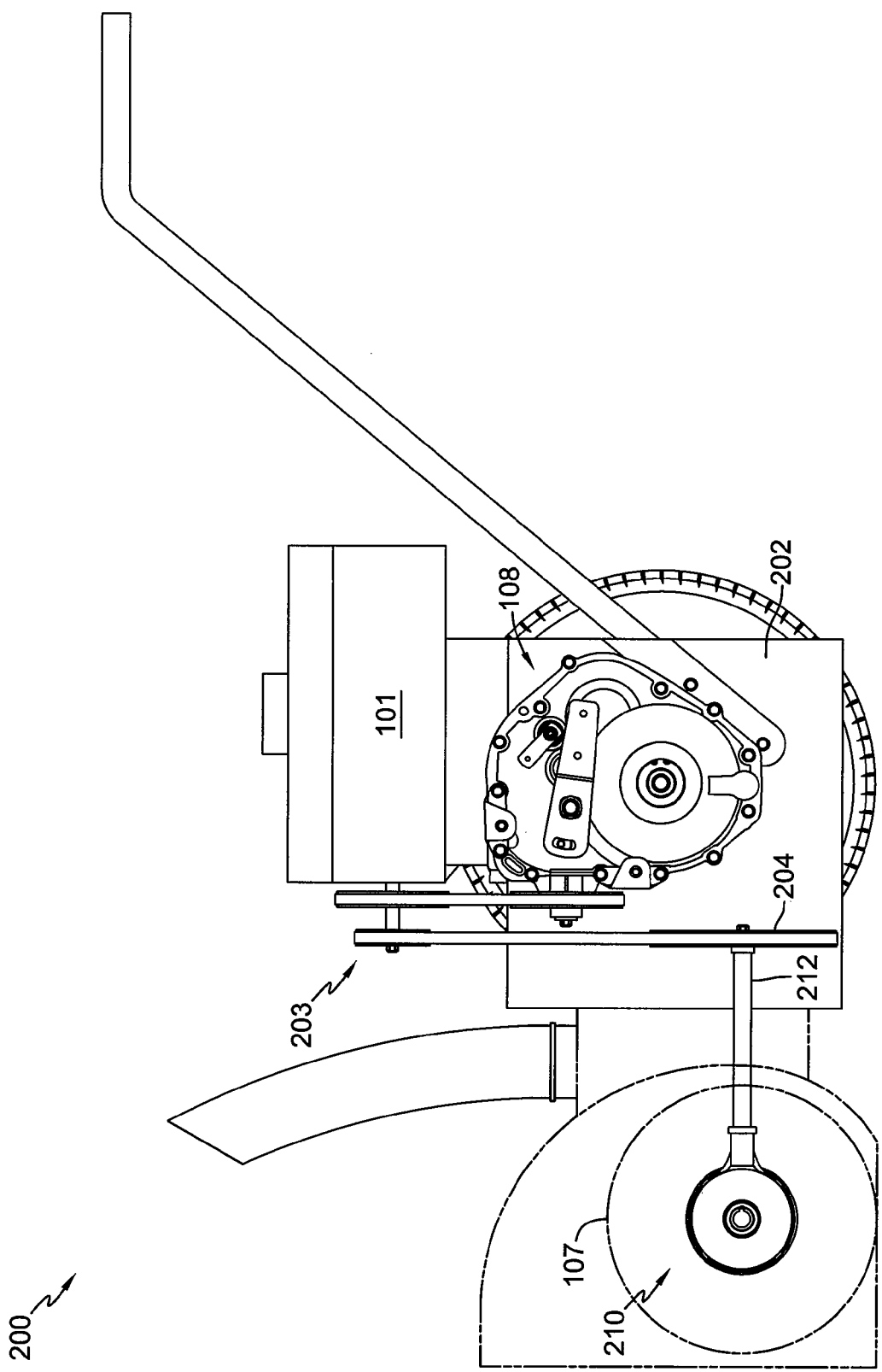
FIG. 5 is a side elevational view of a snow thrower incorporating a second embodiment of a gear drive assembly in accordance with the principles of the present invention.

Input shaft 112 of gear drive assembly 110 is engaged to belt and pulley system 103 by means of input pulley 104. Gear drive assembly 110 includes a two-piece housing structure comprising main housing 120 and housing cover 130 joined together by means of a series of fasteners 172, as shown most clearly in FIGS. 2 and 3. Disposed within the housing is a gear assembly 140 which includes a pinion bevel gear 142 disposed on an end of input shaft 112 and engaged to and driving domed bevel gear 144. As seen most clearly in FIG. 4, nested bevel gear 146 is disposed on gear support shaft 152 and rotates with domed bevel gear 144 to drive output bevel gear 148, which is splined to tubular output shaft 150. Gear 144 may be engaged to gear 146 by means of a gear-form type of interface, as shown, or by other tight-fitting, known interface shapes and joining methods. The shape of domed bevel gear 144, as shown in FIG. 4, permits bevel gear 146 to be disposed primarily inside the dome, providing an overlap, in the vertical direction, of bevel gear 144 and output bevel gear 148, thereby permitting a compact unit. Bevel gears 142, 144, 146 and 148 form a two-stage gear reduction assembly.

Output shaft 150 is provided with keyway 151 to drive auger 107 or an alternate device. Other known means of transferring such rotational force may be used in place of keyway 151. Plug 156 may be inserted or screwed into an opening in main housing 120 in order to seal assembly 110 after lubricant is added and also to retain shaft 152. Various thrust washers, such as washers 162, 164 and 166, may be provided as needed to prevent excessive wear which can be caused by gears running against other components, such as housing components, for example.

A second embodiment gear drive assembly 210, for use on vehicle 200, is depicted in FIGS. 5-8. Minor variations, such as in the size of frame 202 and belt and pulley assembly 203, are required on vehicle 200 due to differences between gear drive assembly 210 and the prior embodiment, as detailed below. In an arrangement similar to that of previously described vehicle 100, input shaft 212 of gear drive assembly 210 is engaged to belt and pulley system 203 by means of input pulley 204.

Figure 6:
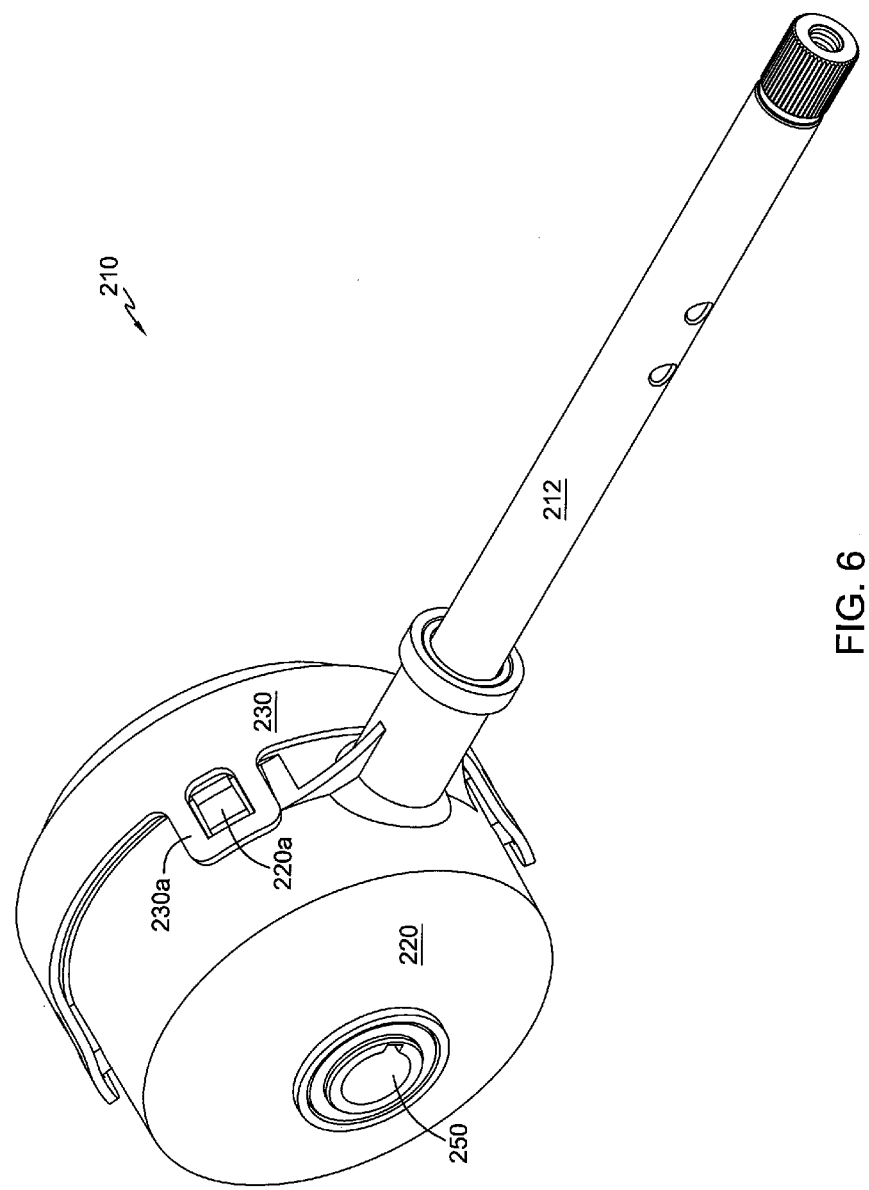
FIG. 6 is a perspective view of the gear drive assembly in accordance with the second embodiment.
Figure 7:
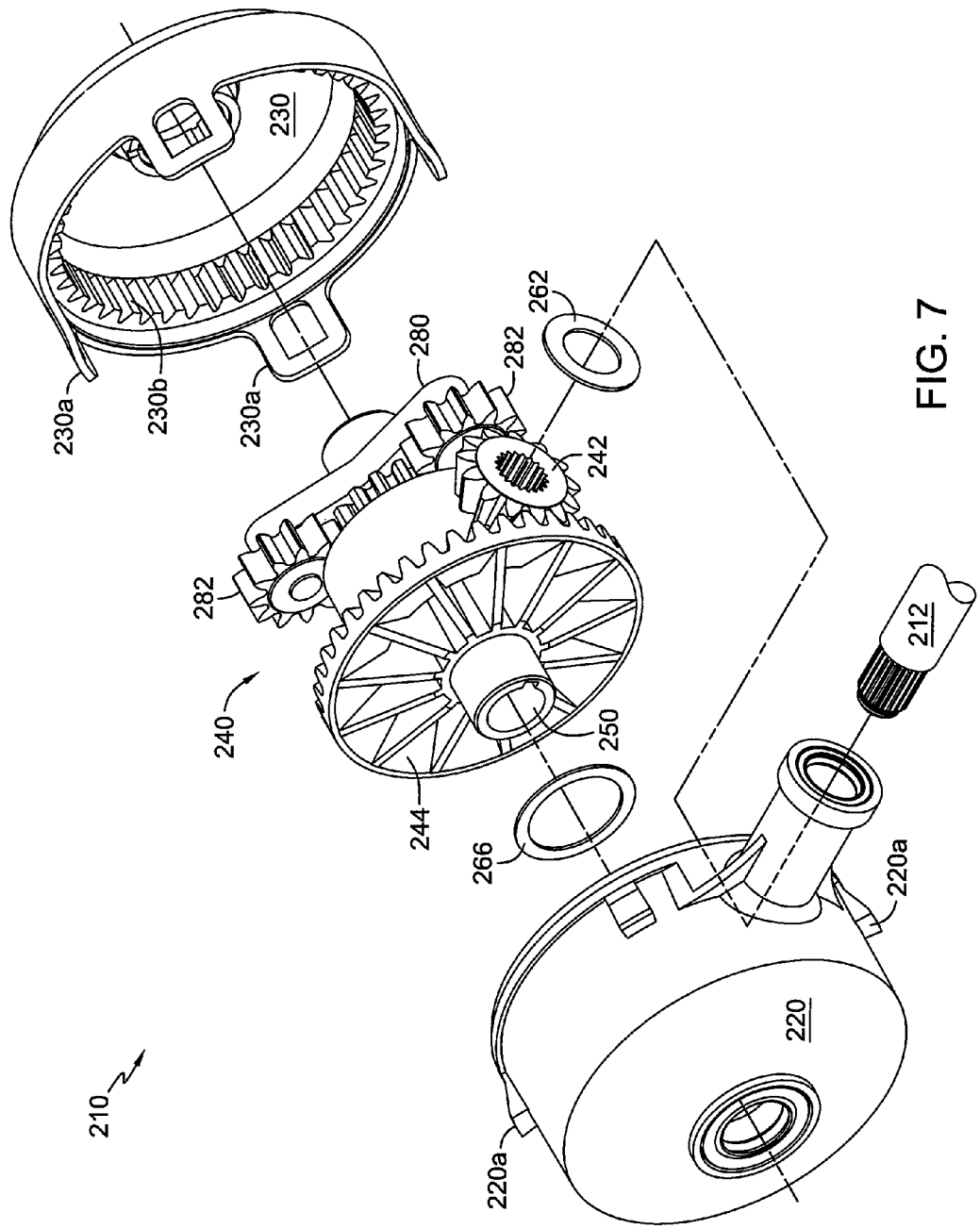
FIG. 7 is an exploded perspective view of the gear drive assembly of FIG. 6.

A unique housing assembly is shown most clearly in FIGS. 6 and 7, wherein main housing 220 and housing cover 230 are connected by means of a series of locking tabs 230a engaging a corresponding series of projections 220a. Other means of securing the housing elements such as fasteners, gluing or ultrasonic welding could also be used.

Figure 8:
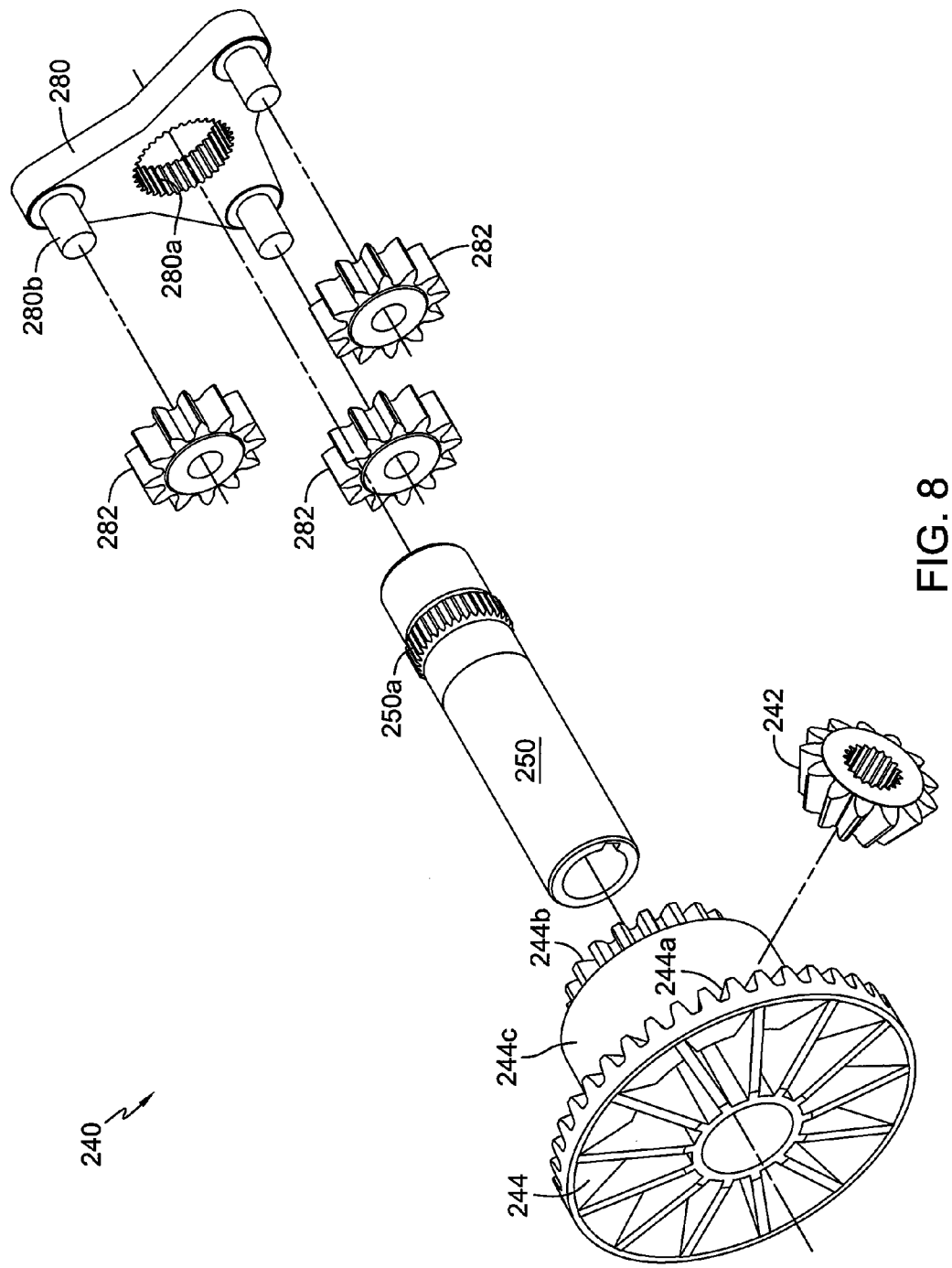
FIG. 8 is a further exploded perspective view of certain gearing components of the gear drive assembly of FIG. 6.

As shown in FIGS. 7 and 8, this embodiment includes gear assembly 240 comprising bevel gear reduction as a first stage and planetary gear reduction as a second stage. This arrangement permits the use of plastic gears for certain applications, helping to reduce weight and cost. Ring gear 230b is formed on an inside surface of housing cover 230; it will be understood that ring gear 230b could also be a separate element from cover 230. Ring gear 230b engages a plurality of planetary gears 282 disposed on planetary gear carrier 280.

A pinion bevel gear 242 is disposed on input shaft 212 and drives bevel gear 244a, which in this embodiment is shown integrally formed as part of combination gear 244 along with gear connecting member 244c and sun gear 244b, so that sun gear 244b rotates with bevel gear 244a. It will be understood that gear elements 244a, 244b and 244c could be formed as two or three separate elements secured together using known means. Planetary gears 282, which rotate on pins 280b on carrier 280, are driven by sun gear 244b, thereby transferring rotational force to carrier 280, which applies rotational force to output shaft 250 by means of splines 280a on carrier 280 mating with splines 250a on output shaft 250. As before, output shaft 250 is engaged to the auger to transfer rotational force thereto, and various thrust washers such as washers 262 and 266 may be provided as needed to reduce friction and wear. This arrangement permits a particularly compact gear drive unit; for example, when mounted in the vehicle, input shaft 212 is on the same plane as output shaft 250. This arrangement may require alteration of the location of the blower device (not shown) of vehicle 200 as compared to vehicle 100.

Figure 9:
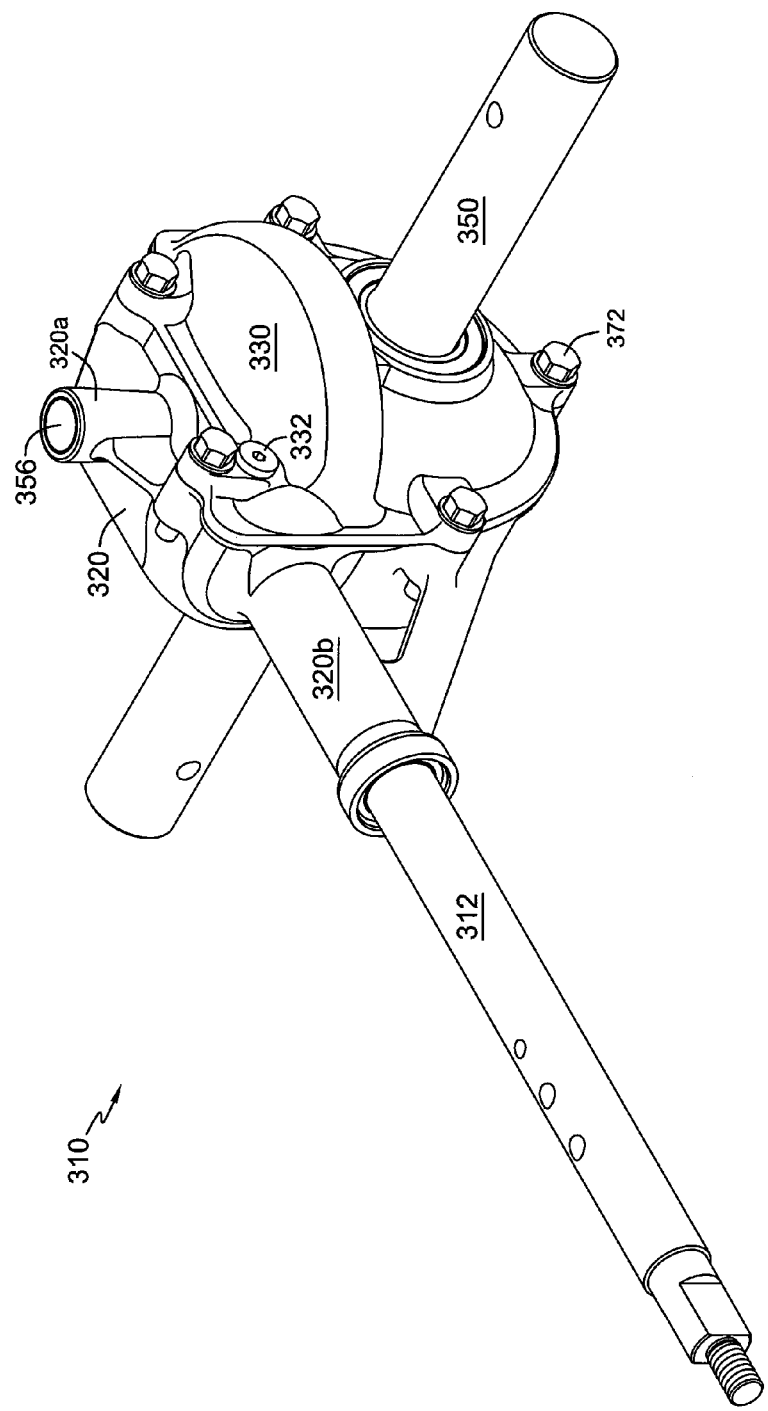
FIG. 9 is a perspective view of a gear drive assembly in accordance with a third embodiment of the present invention.

FIG. 9 shows yet another embodiment, gear drive assembly 310, where housing 320 and cover 330 are joined by fasteners 372 and the output shaft comprises solid shaft 350. Input shaft 312 is partially supported by tubular extension 320b. An internal gear support shaft (not shown) is partially supported by tubular extension 320a and is retained in housing 320 by plug 356. A separate oil fill plug 332 is provided in cover 330. Internal features (not shown) of the third embodiment may be generally consistent with internal features of the fourth embodiment, as described below.

A fourth embodiment, gear drive assembly 410, which may be used on a vehicle similar to vehicle 100, is depicted in FIGS. 10-14.

Figure 10:
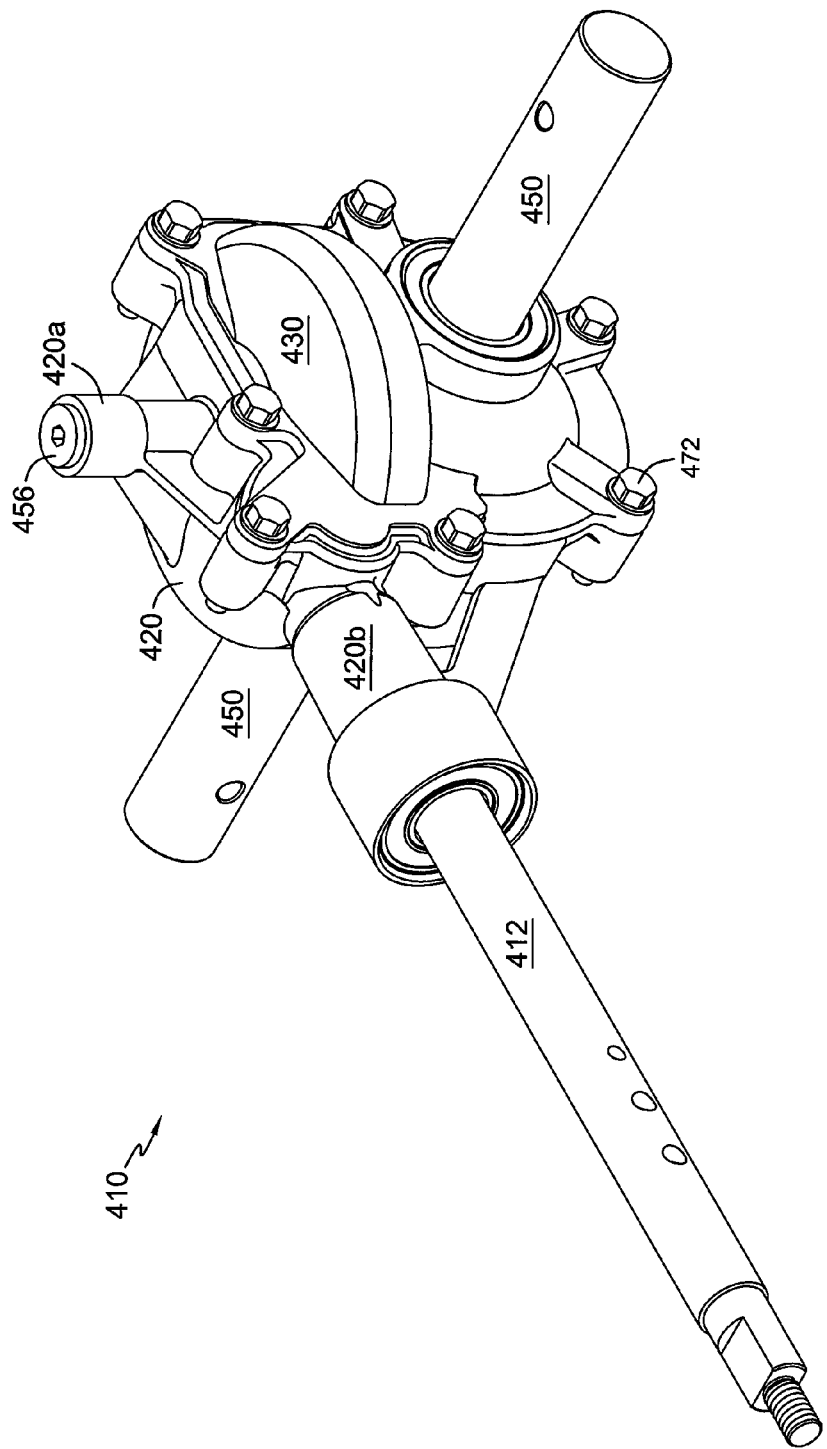
FIG. 10 is a perspective view of a gear drive assembly in accordance with a fourth embodiment of the present invention.
Figure 11:
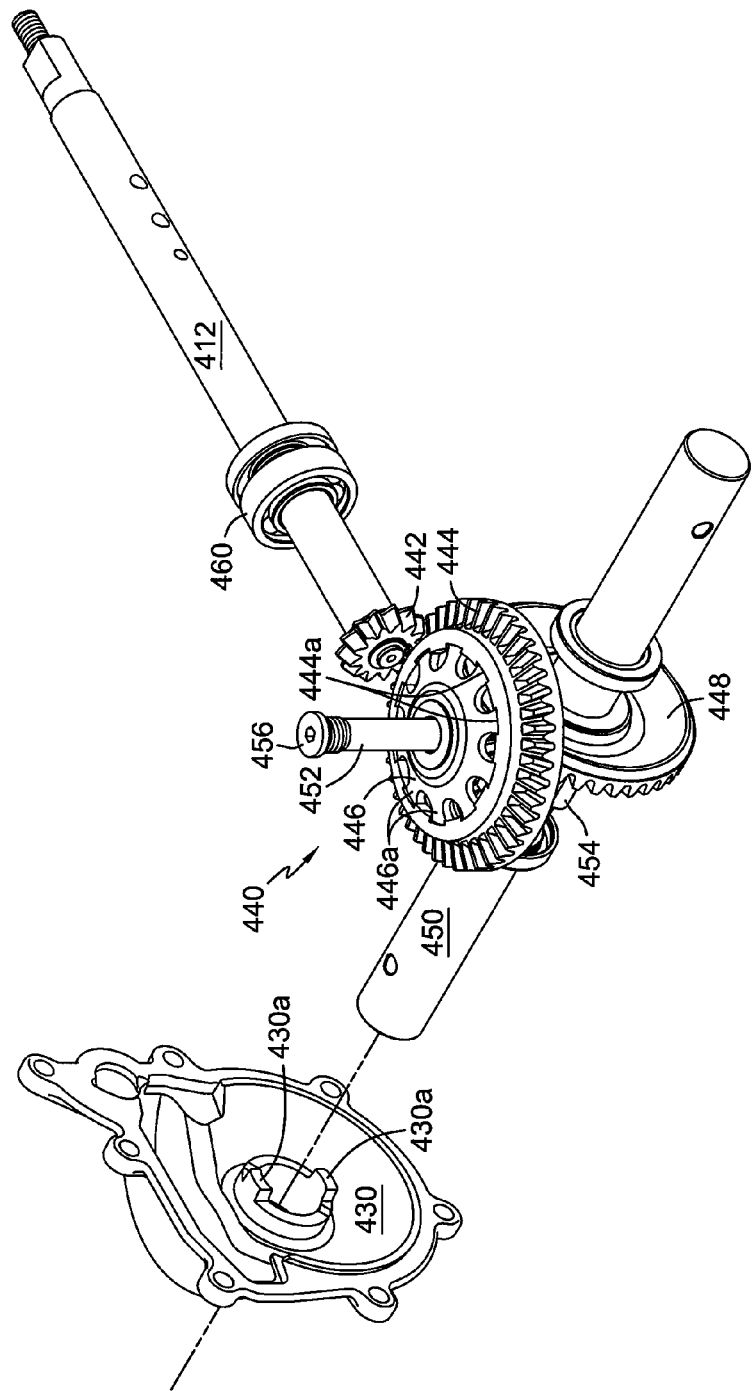
FIG. 11 is an exploded perspective view of certain gearing components and a housing element of the gear drive assembly of FIG. 10.
Figure 12:
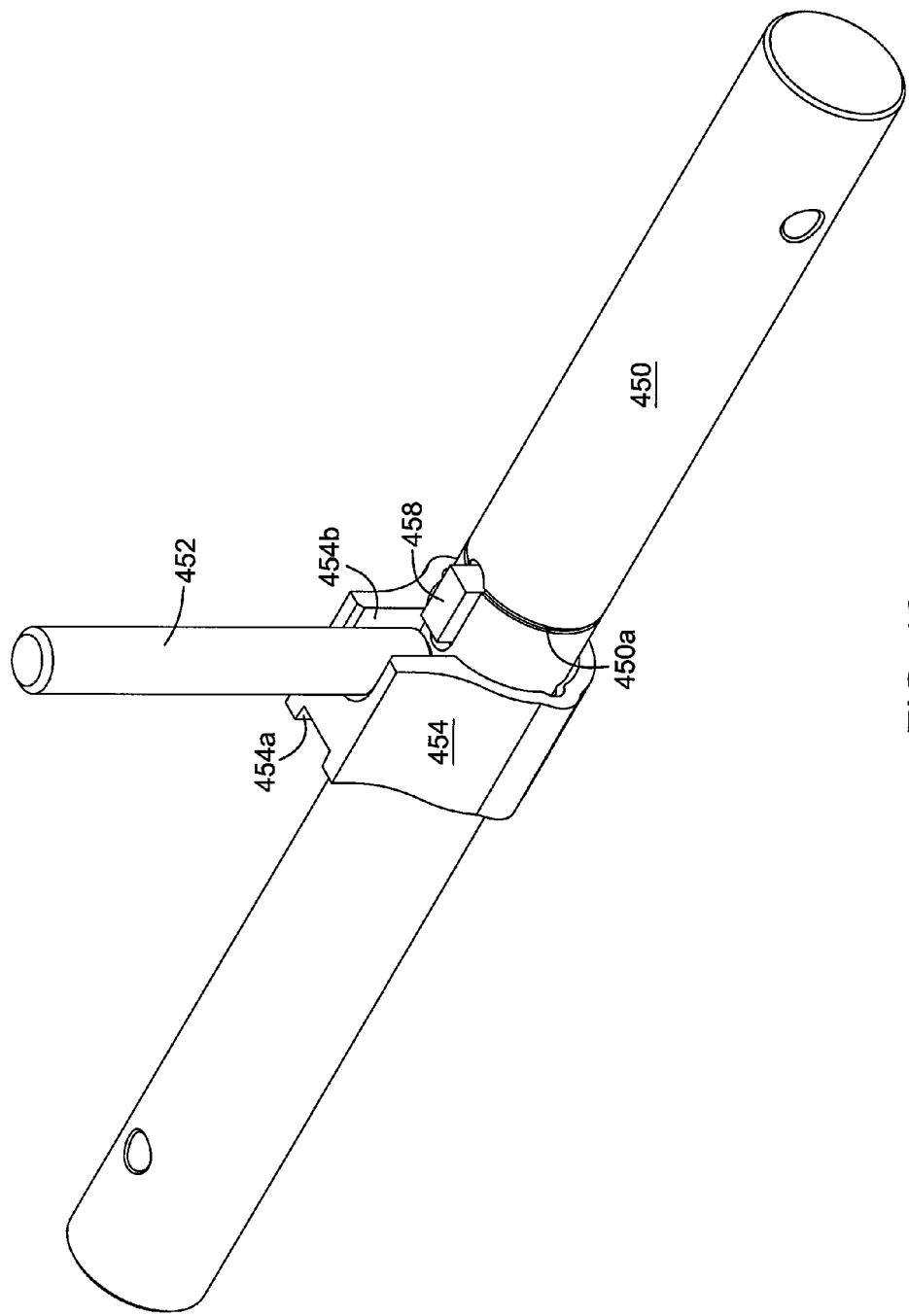
FIG. 12 is a perspective view of an output shaft, a gear support shaft, and a T-bushing element of the gear drive assembly of FIG. 10.
Figure 13:
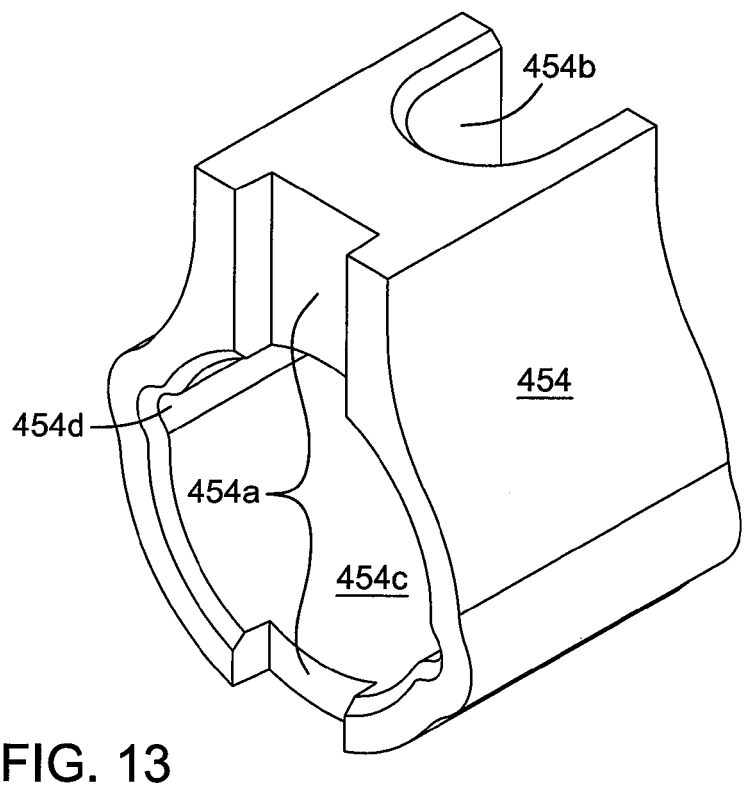
FIGS. 13 and 14 are perspective views of the T-bushing element of FIG. 12.
Figure 14:
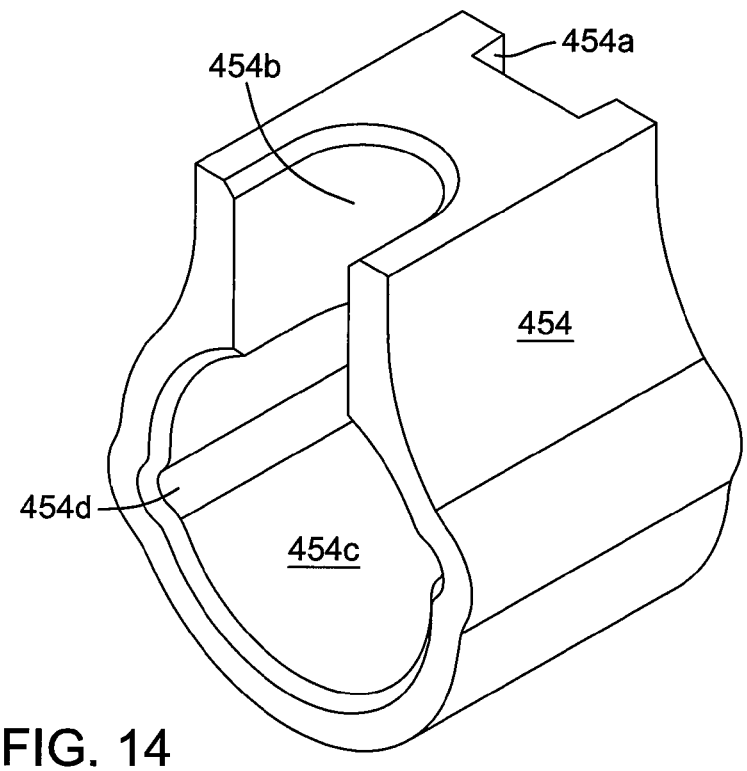

Referring to FIG. 10, gear drive assembly 410 includes input shaft 412, housing 420 and cover 430, which are joined by fasteners 472, and output shaft 450. As best seen in FIG. 11, primarily disposed within housing 420 is a gear assembly 440, which provides two successive bevel gear reductions. A first bevel gear reduction includes a pinion bevel gear 442 disposed on an end of input shaft 412. Gear 442 drives a domed bevel gear 444. A domed flange bevel gear 446 is disposed on gear support shaft 452 and is fixedly nested in domed bevel gear 444 to rotate in unison therewith to drive output bevel gear 448, which is coupled to output shaft 450. Gear 446 is press-fit into gear 444 and then heat-treated so that a plurality of fingers 446a of the domed flange portion of gear 446 expand while a plurality of mating slots 444a in gear 444 contract so that the two gears are tightly locked as the two parts grow together during heat-treating. Gear 446 may be engaged to gear 444 as described or by other known tight-fit joining methods. As such, a second bevel gear reduction is provided by bevel gear 446 and output bevel gear 448. The shape of domed bevel gear 444 permits bevel gear 446 to be disposed primarily inside the dome and provides an overlap of bevel gears 444 and 448 in the vertical direction, thereby permitting a compact unit. As shown in FIG. 12, output shaft 450 is provided with a key 458 configured to engage a keyway (not shown) provided in a circumferential surface of a central opening extending through output bevel gear 448, so that bevel gear 448 is engaged to and drives output shaft 450 during operation. Bevel gear 448 is restrained from axial movement in one direction by T-bushing 454 and in the other direction by a retaining ring (not shown) which engages groove 450a of output shaft 450. Moreover, as is known to one of ordinary skill in the art, bevel gears 442 and 448, for example, can be fixedly attached to respective shafts 412 and 450 by various other known methods, such as press-fitting, corresponding splined surfaces, setscrews, adhesives or other suitable means.

As shown in FIG. 10, housing 420 includes a tubular extension 420a that accommodates an upper portion of gear support shaft 452. Tubular extension 420a includes an external opening for adding lubricant to gear drive assembly 410, and plug 456 serves to close the external opening and retain gear support shaft 452 shown in FIG. 11. Input shaft 412 is rotatably supported in tubular extension 420b of housing 420 by a bearing 460 that can withstand a radial load and a thrust load acting on input shaft 412. Bearing 460 may be any suitable bearing, such as, for example, an angular type bearing.

Now referring to FIGS. 11-14, a T-bushing 454 is provided with anti-rotation slots 454a, a shaft support slot 454b, and a through-bore 454c to accommodate output shaft 450. Through-bore 454c defines an inner circumferential surface which is provided with one or more lubrication grooves 454d to facilitate the flow of a lubricant, such as oil, through T-bushing 454, thereby coating during operation at least an adjacent external surface of rotating output shaft 450. Through-bore 454c may also be lined with an anti-friction material which can reduce wear on T-bushing 454 and on output shaft 450. Anti-rotation slots 454a and support slot 454b are arranged on opposite vertical sides of T-bushing 454, the vertical sides being perpendicular to the axis of output shaft 450. Anti-rotation slots 454a are configured to engage with tabs 430a formed on an internal surface of housing cover 430, and U-shaped support slot 454b is configured to accommodate therein gear support shaft 452. When gear drive assembly 410 is assembled, anti-rotation slots 454a are mechanically locked to tabs 430, thereby providing rigid support for shaft 452 and preventing the two-stage bevel gear reduction assembly 440 from rotating along with rotating output shaft 450 during operation. This rigid support function provided by T-bushing 454 facilitates proper gear meshing resulting in noise reduction, smooth operation and longer service life of gear drive assembly 410. As shown, T-bushing 454 includes an elongated vertical support slot 454b to provide support for gear support shaft 452. Although two anti-rotation slots 454a are shown in T-bushing 454, a different number of slots 454a and a corresponding number of tabs 430a may be provided.

Gear drive assembly 410 can be made of metallic and non-metallic materials. Metallic materials may include, but are not limited to, steel, stainless steel, anodized aluminum, aluminum, titanium, magnesium, brass, and their respective alloys. Non-metallic materials, suitable for housing 420, cover 430 and select rotating and non-rotating internal components for example, may include, but are not limited to, various plastic and polymeric compounds. Typical industry methods of forming such metallic materials include various known techniques, such as casting, forging, shearing, bending, machining, riveting, welding, powdered metal processing, extruding, molding, and others.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A compact gear drive assembly for powered equipment, comprising:
   a housing having a first tubular extension on a first side, a second side perpendicular to the first side, and a third side opposite the second side;
   an input shaft having a first end located in the housing and a second end extending from the housing through the first tubular extension;
   a first stage gear reduction engaged to and driven by the first end of the input shaft, the first stage gear reduction comprising a pinion bevel gear fixed to and driven by the first end of the input shaft and a domed bevel gear engaged to and driven by the pinion bevel gear;
   a second stage gear reduction engaged to and driven by the first stage gear reduction; and
   an output shaft engaged to and driven by the second stage gear reduction;
   wherein the output shaft may engage the powered equipment at the second and third sides of the housing.

2. The compact gear drive assembly of claim 1, wherein the output shaft comprises a tubular output shaft.

3. The compact gear drive assembly of claim 1, wherein the domed bevel gear comprises a convex face and a concave face opposite the convex face, and the pinion bevel gear engages the domed bevel gear on the perimeter of the convex face.

4. The compact gear drive assembly of claim 3, wherein the domed bevel gear further comprises a central opening formed to fixedly engage and rotate a first bevel gear of the second stage gear reduction.

5. The compact gear drive assembly of claim 4, wherein the first bevel gear of the second stage gear reduction is located adjacent to the concave face of the domed bevel gear and lies at least partially within a volume created by the concave face of the domed bevel gear.

6. The compact gear drive assembly of claim 5, further comprising a T-shaped bushing formed to rotatably support a support shaft in a first notch and the output shaft at a throughbore, wherein the rotational axis of the support shaft and the rotational axis of the output shaft are perpendicular and coplanar.

7. The compact gear drive assembly of claim 6, wherein the t-shaped bushing further comprises at least one anti-rotation notch opposite the first notch, and the housing has at least one interior projection to fixedly engage the at least one anti-rotation notch.

8. The compact gear drive assembly of claim 6, wherein the second stage gear reduction further comprises a second bevel gear engaged to and driven by the first bevel gear of the second stage gear reduction having a circular opening at its center of rotation with a keyway to accept the output shaft and a key, wherein the second bevel gear is retained laterally on the output shaft by the T-shaped bushing and a retaining ring.

9. The compact gear drive assembly of claim 4, wherein the second stage gear reduction comprises a second bevel gear engaged to and driven by the first bevel gear of the second stage gear reduction.

10. The compact gear drive assembly of claim 9, wherein the second bevel gear of the second stage gear reduction partially lies within a volume created by the concave face of the domed bevel gear.

11. The compact gear drive assembly of claim 9, wherein the second bevel gear of the second stage gear reduction has a circular opening at its center of rotation having a form that fixedly engages a corresponding form on the output shaft to thereby rotate the output shaft.

12. The compact gear drive assembly of claim 4, wherein the central opening of the domed bevel gear has a plurality of slots to receive a plurality of fingers from the first bevel gear of the second stage gear reduction.

13. The compact gear drive assembly of claim 1, wherein the second stage gear reduction comprises a single stage planetary system having a carrier and plurality of planet gears driven by the sun gear.

14. The compact gear drive assembly of claim 13, wherein the carrier is engaged to and drives the output shaft.

15. A compact gear drive assembly for powered equipment, comprising:
   a housing comprising a first housing component having a plurality of locking tabs and a second housing component having a plurality of corresponding projections which engage the plurality of locking tabs to seal the first housing component to the second housing component;
   a first tubular extension on a first side of the housing, the housing further comprising a second side perpendicular to the first side and a third side opposite the second side;
   an input shaft having a first end located in the housing and a second end extending from the housing through the first tubular extension;
   a first stage gear reduction engaged to and driven by the first end of the input shaft and a second stage gear reduction engaged to and driven by the first stage gear reduction; and an output shaft engaged to and driven by the second stage gear reduction, wherein the output shaft may engage the powered equipment at the second and third sides of the housing.

16. The compact gear drive assembly of claim 15, wherein the first stage gear reduction comprises a pinion bevel gear fixed to and driven by the first end of the input shaft and a combination gear driven by the pinion bevel gear having a mating bevel gear at a first end and a sun gear at a second end.

17. A compact gear drive assembly for powered equipment, comprising:
   a housing comprising a main housing and a housing cover;
   a first tubular extension on a first side of the housing, wherein the housing further comprises a second side perpendicular to the first side; and a third side opposite the second side;
   an input shaft having a first end located in the housing and a second end extending from the housing through the first tubular extension;
   a first stage gear reduction engaged to and driven by the first end of the input shaft;
   a second stage gear reduction engaged to and driven by the first stage gear reduction, the second stage gear reduction comprising a planetary gear system having a carrier, a plurality of planet gears driven by a sun gear, and a stationary ring gear formed on an internal surface of the housing cover; and
   a single output shaft engaged to and driven by the second stage gear reduction, wherein the single output shaft extends from the housing at the second and third sides.

18. The compact gear drive assembly of claim 17, wherein the housing cover comprises a stationary ring gear.

19. The compact gear drive assembly of claim 17, wherein the rotational axis of the input shaft and the rotational axis of the output shaft are coplanar.

* * * * *